US010486400B2

(12) United States Patent
Kai et al.

(10) Patent No.: US 10,486,400 B2
(45) Date of Patent: Nov. 26, 2019

(54) ABRASION-RESISTANT FABRIC

(71) Applicants: ASAHI KASEI FIBERS CORPORATION, Osaka (JP); W. L. GORE & ASSOCIATES, CO., LTD., Tokyo (JP)

(72) Inventors: Koichi Kai, Tokyo (JP); Satoko Sakata, Tokyo (JP); Yuichiro Nozaki, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 109 days.

(21) Appl. No.: 14/890,848

(22) PCT Filed: May 14, 2014

(86) PCT No.: PCT/JP2014/062850
§ 371 (c)(1),
(2) Date: Nov. 12, 2015

(87) PCT Pub. No.: WO2014/185453
PCT Pub. Date: Nov. 20, 2014

(65) Prior Publication Data
US 2016/0075116 A1 Mar. 17, 2016

(30) Foreign Application Priority Data

May 14, 2013 (JP) ................................ 2013-102369

(51) Int. Cl.
| | | |
|---|---|---|
| *B32B 27/12* | (2006.01) | |
| *D03D 1/00* | (2006.01) | |
| *B32B 27/32* | (2006.01) | |
| *B32B 5/02* | (2006.01) | |
| *D03D 15/00* | (2006.01) | |

(52) U.S. Cl.
CPC ............. *B32B 27/12* (2013.01); *B32B 5/024* (2013.01); *B32B 27/322* (2013.01); *D03D 1/0041* (2013.01); *D03D 15/0083* (2013.01); *B32B 2262/0261* (2013.01); *B32B 2307/554* (2013.01); *B32B 2307/584* (2013.01); *B32B 2307/712* (2013.01); *B32B 2307/718* (2013.01); *B32B 2307/724* (2013.01); *B32B 2307/7265* (2013.01); *B32B 2307/73* (2013.01); *B32B 2437/00* (2013.01); *D10B 2331/02* (2013.01); *D10B 2501/04* (2013.01)

(58) Field of Classification Search
CPC ................ D10B 2331/02; B32B 5/024; B32B 2305/188; B32B 2262/0261; B32B 2377/00; B32B 27/322; B32B 2327/18; Y10T 442/2189; Y10T 442/2238; Y10T 442/227; Y10T 442/2287; Y10T 442/232; Y10T 442/22893; Y10T 442/03; C08L 27/18

USPC .......... 442/82, 88, 92, 94, 98, 168, 181–303
See application file for complete search history.

(56) References Cited

U.S. PATENT DOCUMENTS

| | | | |
|---|---|---|---|
| 4,619,864 A * | 10/1986 | Hendrix | ................ D06B 1/142 427/387 |
| 2003/0159749 A1 | 8/2003 | Hotta et al. | |
| 2005/0176323 A1 | 8/2005 | Minato et al. | |
| 2009/0029617 A1 | 1/2009 | Akimori et al. | |
| 2009/0053952 A1 | 2/2009 | Zhu et al. | |
| 2010/0071115 A1 | 3/2010 | Sadato | |
| 2013/0196561 A1* | 8/2013 | Shibata | ................ D03D 13/008 442/76 |

FOREIGN PATENT DOCUMENTS

| | | |
|---|---|---|
| GB | 1 431 568 A | 4/1976 |
| GB | 2 452 568 A | 3/2009 |
| JP | S50-18803 B | 7/1975 |
| JP | S55-93813 A | 7/1980 |
| JP | S62-273876 A | 11/1987 |
| JP | 05-338069 | 12/1993 |
| JP | 6-123057 A | 5/1994 |
| JP | 10-310932 A | 5/1994 |
| JP | 06-341029 | 12/1994 |
| JP | 2004-52191 | 2/2004 |
| JP | 2005-206994 | 8/2005 |
| JP | 2006-057190 A | 3/2006 |
| JP | 2008-69487 A | 3/2008 |
| JP | 4479394 | 6/2010 |
| KR | 10-2002-0072306 A | 9/2002 |
| WO | WO 2006-095863 A1 | 9/2006 |

OTHER PUBLICATIONS

U.S. Appl. No. 15/546,230.*
VELCRO Brand Product Line; https://www.anixter.com/content/dam/Suppliers/Velcro/Velcro%20Brand_2015%20US%20Product%20line%20Brochure.pdf; accesssed Aug. 25, 2017.*
Kuraray, Magic Tape New EcoMagic, https://www.magic-tape.com/catalog/ecomagic/?startpage=0, accessed Jan. 6, 2018 (Year: 2018).*
Supplementary European Search Report for corresponding EP Application No. 14797301.0 dated Nov. 15, 2016.
Written Opinion of the International Searching Authority from the Japanese Patent Office, dated Aug. 12, 2014, for International Application No. PCT/JP2014/062850.
International Search Report from the Japanese Patent Office, dated Aug. 12, 2014, for International Application No. PCT/JP2014/062850.
International Preliminary Report on Patentability from the Japanese Patent Office, dated Aug. 12, 2014, for International Application No. PCT/JP2014/062850.

(Continued)

*Primary Examiner* — Arti Singh-Pandey
(74) *Attorney, Agent, or Firm* — Finnegan, Henderson, Farabow, Garrett & Dunner LLP

(57) ABSTRACT

The purpose of the present invention is to provide a fabric provided with both excellent abrasion resistance and soft texture, and this fabric is a fabric having excellent abrasion resistance in which at least a portion of a warp or a weft yearn thereof comprises a polyamide fiber twisted yarn.

17 Claims, No Drawings

(56) References Cited

OTHER PUBLICATIONS

Written Argument of JP Patent Application No. 2015-517109 dated Jun. 6, 2016.
European Office Action dated Jan. 18, 2019 in European Application No. 14797301.0 by the European Patent Office (5 pages).
Handbook of Textile Fiberes, vol. II—Man Made Fibres, $5^{th}$ Edition, J. Gordon Cook, Woodhead Publishing, 1993.
Office Action for corresponding EP Application No. 14797301.0 dated Apr. 16, 2018.
Korean Office Action dated Mar. 11, 2019 in Korean Application No. 10-2018-7011738 by the Korean Patent Office (5 pages).

* cited by examiner

ABRASION-RESISTANT FABRIC

TECHNICAL FIELD

The present invention relates to a fabric provided with superior abrasion resistance and soft texture.

BACKGROUND ART

Sportswear and outdoor wear (clothing worn when engaging in outdoor activities such as mountain climbing or camping) are required to be made of a fabric that is highly resistant to abrasion since considerable abrasion occurs between the clothing and other objects (such as contact between athletes or contact with athletic gear, abrasion with a backpack or rope or rubbing against the ground, rocks or trees).

Polyamide fibers or polyester fibers are widely used in this sportswear and outdoor wear. In particular, this clothing has become increasingly lightweight and compact in recent years. However, it is still required to have a soft texture while providing a minimum required level of durability.

In order to impart durability, lowering frictional resistance by employing a special modified cross-section structure (see Patent Document 1 below), employing a blended fabric consisting of two or more types of fibers (see Patent Document 2 below), and using high-tenacity yarn obtained by a specialized spinning technique (see Patent Document 3) have been proposed.

However, although this art results in superior abrasion resistance, it is difficult to obtain fineness and also prevents the obtaining of soft texture.

PRIOR ART DOCUMENTS

Patent Documents

Patent Document 1: Japanese Patent No. 3895227
Patent Document 2: Japanese Unexamined Patent Publication No. H6-123057
Patent Document 3: Japanese Unexamined Patent Publication No. H10-310932

SUMMARY OF THE INVENTION

Problem to be Solved by the Invention

It is essential for clothing fabric to have the characteristics of a light, soft and resilient feel while also being colorful, and it goes without saying such characteristics can be simultaneously imparted to a fabric by using ordinary filament yarn. However, in looking at the example of a light feel, when a light feel is achieved by using fine yarn, a portion of other characteristics end up being impaired, such as being unable to obtain adequate strength for use as clothing.

An object of the present invention is to provide a fabric that is resistant to the occurrence of scuffing and tearing with respect to various forms of abrasion between articles of clothing and with other objects that occur when used as clothing, and particularly as sportswear or outdoor wear, demonstrates superior abrasion resistance, and has a superior texture.

Means for Solving the Problems

As a result of conducting extensive research to achieve the aforementioned object, the inventor of the present invention found that there is a correlation between abrasion resistance for actually wearing a clothing fabric and an evaluation of abrasion according to the "surface abrasion method using a hook-and-loop fastener", and that a fabric in which at least a portion of the warp yarn or weft yarn comprises a polyamide fiber twisted yarn is superior in the aforementioned evaluation of abrasion, thereby leading to completion of the present invention. Furthermore, evaluation of abrasion according to the "surface abrasion method using a hook-and-loop fastener" will be subsequently described.

Namely, the present invention is as indicated below.

(1) A fabric having superior wear resistance in which at least a portion of the warp yarn or weft yarn comprises a polyamide fiber twisted yarn.

(2) The fabric described in (1) above, wherein at least a portion of the warp yarn comprises a polyamide fiber twisted yarn.

(3) The fabric described in (1) or (2) above, wherein at least a portion of the weft yarn comprises a polyamide fiber twisted yarn.

(4) The fabric described in any of (1) to (3) above, wherein the result of an abrasion durability test of the fabric according to the surface abrasion method using a hook-and-loop fastener is grade 3 or better.

(5) The fabric described in any of (1) to (4) above, wherein the yarn that composes the fabric is a processed yarn.

(6) The fabric described in any of (1) to (5) above, wherein the twist coefficient of the twisted yarn is 200 to 10,000.

(7) The fabric described in (6) above, wherein the twist coefficient is 500 to 5,000.

(8) The fabric described in (7) above, wherein the twist coefficient is 1,000 to 3,000.

(9) The fabric described in any of (1) to (8) above, wherein water-repellent processing is carried out thereon.

(10) The fabric described in any of (1) to (9) above, wherein calendering is carried out on at least one side thereof.

(11) A composite fabric obtained by carrying out lamination processing on the fabric described in any of (1) to (10) above.

(12) The composite fabric described in (11) above, wherein the lamination processing consists of laminating a flexible film.

(13) The composite fabric described in (12) above, wherein the flexible film is a waterproof film.

(14) The composite fabric described in (12) above, wherein the flexible film is a waterproof moisture-permeable film.

(15) The composite fabric described in (14) above, wherein the waterproof moisture-permeable film is a porous film composed of a hydrophobic resin.

(16) The composite fabric described in (15) above, wherein the hydrophobic resin is polytetrafluoroethylene.

(17) The composite fabric described in (15) above, wherein the porous film is an expanded porous polytetrafluoroethylene film.

(18) The composite fabric described in any of (15) to (17) above, wherein the porous film has a hydrophilic resin layer on the opposite side from the side laminated with the fabric in which at least a portion thereof comprises a polyamide fiber twisted yarn.

(19) The composite fabric described in any of (12) to (18) above, wherein the flexible film is further laminated with a second fabric on the opposite side from the side laminated with the fabric in which at least a portion thereof comprises a polyamide fiber twisted yarn.

(20) A fabric product in which is used the fabric described in any of (1) to (10) above or the composite fabric described in any of (11) to (19) above.

(21) The fabric product described in (20) above, wherein the fabric product is a clothing product.

(22) The fabric product described in (21) above, wherein the fabric or the composite fabric is used in at least a portion of the shoulders, elbows, knees, sleeves or hems of the clothing product.

(23) The fabric product described in (21) or (22) above, wherein the clothing product is a downproof fabric.

(24) The fabric product described in (21) or (22) above, wherein the clothing product is a fabric for outdoor wear.

(25) The fabric product described in (21) or (22) above, wherein the clothing product is a fabric for a windbreaker.

Effects of the Invention

According to the present invention, a fabric having superior abrasion resistance is obtained, which overcomes the lack of abrasion resistance associated with fabrics using fine yarn or processed yarn, and has a soft texture.

EMBODIMENTS FOR CARRYING OUT THE INVENTION

The following provides a detailed explanation of the invention.

Synthetic fiber filament yarn can be used for the yarn that composes the fabric of the present invention. Ordinary synthetic fiber filament yarn such as polyamide fiber or polyester fiber filament yarn is preferably used for the synthetic fiber filament yarn. Polyamide fiber is particularly preferable due to its superior strength and heat resistance.

In addition, although examples of the yarn that composes the fabric of the present invention include raw yarn, composite yarn as well as processed yarn such as false-twist textured yarn or Taslan finished yarn, raw yarn or processed yarn is preferable, processed yarn is more preferable, and false-twist textured yarn is most preferable. This is because, when finished into fabric products, the use of false-twist textured yarn results in a softer fabric texture than raw yarn.

Although the aforementioned false-twist textured yarn may be obtained by any ordinarily used method such as with a pin type, friction type, nip belt type or air heating type of false twisting machine, a friction type is preferable from the viewpoint of productivity.

In addition, among the yarn that composes the fabric of the present invention, it is important that at least a portion of the warp yarn or weft yarn comprise a twisted yarn in which twists have been formed in the aforementioned yarn. The use of twisted yarn for at least a portion of the warp yarn or weft yarn allows the obtaining of a fabric that has a soft texture and superior abrasion resistance.

In the case of using for the warp yarn, twisted yarn is preferably used at 10% to 100%, more preferably at 30% to 100%, and particularly preferably at 50% to 100% of the total amount of the warp yarn. In addition, in the case of using for the weft yarn, twisted yarn is preferably used at 10% to 100%, more preferably at 30% to 100%, and particularly preferably at 50% to 100% of the total amount of the weft yarn.

Moreover, twisted yarn is most preferably used for both the warp yarn and weft yarn.

The twist coefficient of the twisted yarn that composes the fabric of the present invention is preferably 200 to 10,000, more preferably 500 to 5,000 and particularly preferably 1,000 to 3,000. If the twist coefficient is less than 200, the effect of the twisted yarn is low and the effect of improving abrasion resistance is diminished. In addition, if the twist coefficient exceeds 10,000, although abrasion resistance is favorable, texture tends to be hard.

Twist coefficient as referred to here is a value calculated from the equation indicated below.

$$\text{Twist coefficient} = T \times (D)^{1/2}$$

In the above equation, T represents the number of twists (T/m) of the twisted yarn, while D represents the total fineness (dtex) of the twisted yarn.

There are no particular limitations on the shape of the twisted yarn, and can have a circular cross-section, triangular cross-section, multi-lobe cross-section, hollow cross-section, flat cross-section or split-type core-sheath cross-section.

The fineness of the twisted yarn that composes the fabric of the present invention is preferably 8 dtex to 155 dtex and more preferably 20 dtex to 110 dtex. If the fineness is less than 8 dtex, fineness becomes excessively thin, thereby making it increasingly likely for handling of fibers in the weaving step to be difficult. If the fineness exceeds 155 dtex, the thickness of a thin fabric for clothing becomes excessively thick resulting in an unfavorable texture. Fineness is particularly preferably 20 dtex to 80 dtex.

The present invention is characterized in that the fabric has superior abrasion resistance even though it is composed of fine fibers, and has superior abrasion resistance even if composed of fine count fibers of 20 dtex to 44 dtex in particular. As a result, a lightweight, thin fabric using these yarns is able to have superior abrasion resistance even in the case of a fabric having a basis weight of, for example, 50 g/m² or less.

Although there are no particular limitations on the number of filaments, since yarn strength decreases if the number of filaments is excessively large, the number of filaments is preferably 0.3 dtex to 3 dtex, and more preferably 0.5 dtex to 2 dtex, per single yarn filament.

Although the twisted yarn that composes the fabric of the present invention may be obtained by any method such as a double twister, Italian-type twister or yarn covering machine, a double twister is preferable from the viewpoint of productivity. In addition, carrying out false-twisting in advance prior to carrying out twisting processing is preferable since it improves soft texture.

Although the twisting direction of the twisted yarn that composes the fabric of the present invention may be the S direction or Z direction, in the case of carrying out false-twisting in advance, the twisting direction is preferably the same as the direction of false-twisting.

Twists of the twisted yarn that composes the fabric of the resent invention can be fixed by twist setting as necessary. Twist setting conditions in that case preferably consist of vacuum steam setting for 30 minutes at 70° C.

Yarn obtained in the form of twisted yarn in this manner is used in at least a portion of the warp yarn or weft yarn followed by weaving with a water jet loom.

Alternatively, the yarn may be woven with an air jet loom, rapier loom or gripper room in consideration of such factors as the shape and fineness of the yarn, such as whether the yarn is processed yarn or twisted yarn, fabric structure, weavability or weaving cost.

Although a plain weave, twill weave or satin weave, or various types of modified weaves derived therefrom, can be applied for the weave of the fabric of the present invention, since a plain weave results in a smooth fabric surface, it is particularly preferable since it allows the obtaining of superior abrasion resistance.

Although the twisted yarn that composes the fabric of the present invention can be used in at least a portion of the warp yarn or weft yarn, since the presence of twisted yarn on the fabric surface improves abrasion resistance, twill-woven warp yarn or the lattice portion of a rip-stop weave is preferably composed of twisted yarn.

Fabric in which twisted yarn obtained by weaving in this manner is used in at least a portion of the warp yarn or weft yarn can be subjected to ordinary scouring processing, presetting processing or dyeing processing. In addition, the fabric may be imparted with a function such as water repellency using an dipping method (padding method) followed by drying and curing as necessary.

Moreover, the fabric may also be subjected to calendering. In addition, lamination processing may be carried out according to a lamination method or coating method in order to impart waterproofing or waterproof moisture permeability and obtain a laminated composite fabric.

There are no particular limitations on the water repellent agent, and examples thereof include fluorine-based, silicone-based and paraffin-based water repellent agents using water or an organic solvent as solvent. Contact with the fabric surface by the water repellent agent inhibits swelling of polyamide fibers due to the effects of moisture and improves abrasion resistance.

Although calendering may be performed on one side or both sides of the fabric depending on the properties and characteristics of the fabric, such as low air permeability or luster, if performed on both sides, since fibers on the top side of the fabric end up being crushed resulting in an undesirable luster and hard texture, calendering is preferably carried out on one side only. Although there are no particular limitations on the number of times calendering is carried out, since fabric strength decreases as this number increases, the fewer the number of times calendering processing is carried out the better.

The result of an abrasion durability test of the fabric in an abrasion durability test of the fabric according to a surface abrasion method using a hook-and-loop fastener to be subsequently described is preferably grade 3 or better, and if the result if grade 2 or lower, there is increased scuffing, fabric strength decreases and water repellency decreases, thereby making this undesirable.

An example of a laminated composite fabric is a fabric having a flexible film laminated on one or both sides thereof. A different fabric may also be further laminated on the non-laminated side of the laminated flexible film. The different fabric laminated on the non-laminated side is not limited to the fabric of the present invention in which at least a portion of the warp yarn or weft yarn is composed of polyamide fiber twisted yarn, but rather any fabric may be laminated corresponding to the application and the like. Examples of the flexible film include a waterproof film and a waterproof moisture-permeable film, and a porous film composed of a hydrophobic resin is preferable for the waterproof moisture-permeable film. Although a urethane resin film, porous polytetrafluoroethylene resin film, polyester film, urethane resin coating or acrylic resin coating having waterproof moisture permeability is preferably imparted to one or both sides of the fabric in particular, the film or coating is not limited thereto. In addition, the non-laminated side of the porous film composed of a hydrophobic resin preferably has a hydrophilic resin layer. Moreover, the aforementioned porous film is preferably an expanded film.

The use of a flexible film makes it possible to impart windproofing to laminated fabric obtained according to the present invention and impart waterproof moisture permeability to a laminated fabric obtained according to the present invention. Furthermore, a film having waterproof moisture permeability is typically also windproof.

In applications such as a windbreaker that require windproofing in particular, air permeability as measured according to Method A of Japanese Industrial Standard (JIS) L-1096 (Frazier method) is preferably 0 cc/cm$^2$·sec to 0.1 cc/cm$^2$·sec or less. Air permeability is determined by measuring twice and calculating the average value thereof.

On the other hand, in applications such as rainwear that require waterproofing in particular, a resin film or nonwoven fabric, having water pressure resistance (waterproofing) of 500 cm to 5,000 cm as measured according to method A of Japanese Industrial Standard (JIS) L 1092, is preferably used in the intermediate layer, and that having water pressure resistance of 500 cm to 2,000 cm is used more preferably. This is measured at a water level rising rate of 600 mm/min±30 mm/min.

Moreover, in order to impart waterproof moisture permeability to superior rainwear having such characteristics, moisture permeability as measured according to Method B-2 of Japanese Industrial Standard (JIS) L 1099 is preferably 200 g/m$^2$·h to 1,500 g/m$^2$·h and more preferably 200 g/m$^2$·h to 600 g/m$^2$·h. Waterproof moisture permeability refers to having "waterproofing" that protects against water and "moisture permeability" that allows permeation of water vapor, and desired waterproof moisture permeability can be imparted by being within the aforementioned ranges of "waterproofing" and "moisture permeability". For example, in the case of processing a laminated fabric of the present invention into clothing, since water vapor from perspiration generated from the body of a wearer passes through the laminated fabric and is dispersed to the outside, a steamy sensation can be prevented when wearing the clothing.

In the case the fabric of the present invention is composed with multifilament yarn, since the multifilament yarn that composes the fabric is twisted, superior abrasion resistance can be obtained by causing the multifilament yarn to converge in the fabric.

The fabric and composite fabric of the present invention have superior texture and abrasion resistance, and can be used in various fabric products. Examples of fabric products include, but are not limited to, clothing products, sheets, curtains and wall cloth. The fabric and composite fabric are particularly preferable for use in clothing products, and among these, are particularly preferable for use in outerwear such as windbreakers, down jackets, sportswear or outdoor wear in which there is extensive abrasion between parts of clothing when worn. In addition, the fabric and composite fabric are also preferably used as downproof fabric. In particular, they are preferable for sportswear and outdoor wear that are worn in harsh environments and for which there is considerable contact and rubbing with other persons.

EXAMPLES

Although the following provides a more detailed explanation of the present invention by indicating examples thereof, the present invention is not limited to only these examples. Furthermore, the aforementioned abrasion durability test of the fabric according to the surface abrasion method using a hook-and-loop fastener was carried out in the manner indicated below.

The hook side of a hook-and-loop fastener (Magic Tape®, Kuraray Co., Ltd.) is attached to the abrasive element of a Type II (gakushin type) rubbing tester complying with JIS standards, a sample adjusted to a temperature of 20° C. and relative humidity of 65% is mounted on the sample stand followed by spraying the surface of the sample five times with water, and after confirming that water droplets have adhered to the entire surface of the fabric, the fabric is rubbed 3,000 times under a load of 200 g followed by assessment of appearance in terms of the degree of scuffing using the criteria indicated below. Furthermore, the size of the sample measured 3 cm long×30 cm wide, and the rubbed area measured 2 cm×20 cm. The test was respectively carried out in the warp direction and weft direction, and the direction that yielded the poorer results was used as the result of overall assessment.

Grade 1: Extensive scuffing, fluff is observed in linear or planar form or scuffing is observed at 50 locations or more Grade 2: Scuffing is observed at 10 to less than 50 locations Grade 3: Scuffing is observed at 3 to less than 10 locations Grade 4: Scuffing is observed at less than 3 locations Grade 5: Scuffing is not observed Examples 1 to 3

Friction false-twisting was carried out using Nylon 6,6 multifilament yarn having a total fineness of 44 dtex and 34 filaments to obtain Z-twisted false-twist textured yarn. This false-twist textured yarn was converted to twisted yarn by twisting in the Z direction using the Model T05 Double Twister manufactured by Tsudakoma Corp. to obtain twisted yarn having 280 twists/meter (twist coefficient: 1,857). A plain woven fabric having a warp density of 165 ends/inch and weft density of 125 ends/inch was produced with a water jet loom using this twisted yarn for the warp yarn and weft yarn. This fabric was subjected to scouring, intermediate setting and dyeing followed by final setting. The results of carrying out an abrasion durability test using a hook-and-loop fastener on the resulting fabric following final setting are shown in Table 1 along with the properties of the fabric.

In addition, after final setting, products that had undergone water-repellent processing and calendering, and products that had undergone water-repellency processing and waterproof moisture-permeable film processing were obtained. The results of carrying out abrasion durability tests using a hook-and-loop fastener on these products are also shown in Table 1 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 1.

The aforementioned waterproof moisture-permeable film processing was carried out in the following manner. Additional hydrophobic coating of a material in the manner of water vapor-permeable polyurethane described in U.S. Pat. No. 4,194,041 was carried out using a porous polytetrafluoroethylene film having waterproof moisture permeability (W. L. Gore & Associates, Inc., weight per unit surface area: 20 g/m², porosity: 80%, maximum pore size: 0.2 µm, average thickness: 30 µm) for the waterproof moisture-permeable film to produce a porous polytetrafluoroethylene film having a hydrophilic polyurethane resin layer. A Tricot knit fabric having a density of 28 gauge and composed of Nylon 66 fibers was laminated onto the side of this porous polytetrafluoroethylene film provided with the hydrophilic polyurethane resin layer, and fabric prior to the aforementioned processing was laminated onto the opposite side from the side provided with the hydrophilic polyurethane resin layer to obtain a composite fabric.

Furthermore, lamination of the fabric prior to the aforementioned processing and the porous polytetrafluoroethylene film having a hydrophilic polyurethane layer was carried out by heating and melting a commercially available reactive hot melt adhesive and applying in the form of dots on the film using a gravure roller, followed by press-bonding the fabric and knit with a roller and adhering by moisture curing.

Next, water-repellency treatment was carried out on the surface of the laminated fabric prior to processing to obtain a waterproof moisture-permeable composite fabric having a three-layer structure.

Examples 4 to 6

Friction false-twisting was carried out in the same manner as Examples 1 to 3 using a Nylon 6,6 multifilament yarn having a total fineness of 78 dtex and 34 filaments to obtain Z-twisted false-twist textured yarn. This false-twist textured yarn was converted to twisted yarn by twisting in the Z direction in the same manner as Examples 1 to 3 using the Model T05 Double Twister manufactured by Tsudakoma Corp. to obtain twisted yarn having 280 twists/meter (twist coefficient: 2,472). A plain woven fabric having a warp density of 170 ends/inch and weft density of 130 ends/inch was produced with a water jet loom in the same manner as Examples 1 to 3 using this twisted yarn for the warp yarn and weft yarn. This fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 1 along with the properties of the fabric.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 1 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 1.

Examples 7 to 9

Rip-stop taffeta woven fabric having a warp density of 130 ends/inch and weft density of 100 ends/inch was produced with a water jet loom using the twisted yarn obtained by carrying out false-twisting and twisting processing in the same manner as Examples 4 to 6 for the warp yarn and weft yarn. This fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 1 along with the properties of the fabric.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 1 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 1.

Examples 10 to 12

Rip-stop taffeta woven fabric having a warp density of 165 ends/inch and weft density of 130 ends/inch was produced with a water jet loom using the twisted yarn obtained by carrying out false-twisting and twisting processing in the same manner as Examples 1 to 3 and non-twisted yarn for the warp yarn and weft yarn.

Furthermore, twisted yarn was used for the entire lattice portion of the rip-stop taffeta, while non-twisted yarn was used for the entire taffeta portion. The resulting fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 1 along with the properties of the fabric.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 1 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 1.

Examples 13 to 15

2/1 twill woven fabric having a warp density of 175 ends/inch and weft density of 150 ends/inch was produced with a water jet loom using the twisted yarn obtained by carrying out false-twisting and twisting processing in the same manner as Examples 4 to 6 for all of the warp yarn and using non-twisted fabric for the weft yarn. This fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 1 along with the properties of the fabric.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 1 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 1.

Examples 16 to 18

Twisted yarn, subjected to false-twisting and twisting processing in the same manner as Examples 1 to 3, and false-twist textured yarn, subjected to false-twisting but not subjected to twisting processing, was obtained. Furthermore, total fineness of the false-twist textured yarn was 33 dtex and the number of filaments was 10. A taffeta woven fabric having a warp density of 170 ends/inch and weft density of 140 ends/inch was produced with a water jet loom using the resulting twisted yarn and false-twist textured yarn, and arranging the false-twist textured yarn in the warp direction in an alignment of 12:2 and in the weft direction in an alignment of 10:2. The resulting fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 1 along with the properties of the fabric.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 1 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 1.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Fineness | Warp (dtex) | | 44 | | | 78 | | | 78 | |
| | Weft (dtex) | | 44 | | | 78 | | | 78 | |
| Twists | Warp | | 280 T/m | | | 280 T/m | | | 280 T/m | |
| | Weft | | 280 T/m | | | 280 T/m | | | 280 T/m | |
| Twist coefficient | Warp | | 1857 | | | 2472 | | | 2472 | |
| | Weft | | 1857 | | | 2472 | | | 2472 | |
| Twisted yarn blend ratio | Warp (%) | | 100 | | | 100 | | | 100 | |
| | Weft (%) | | 100 | | | 100 | | | 100 | |
| | Total (%) | | 100 | | | 100 | | | 100 | |
| | Weave | | Plain | | | Plain | | | Rip-stop taffeta | |
| | Processing | Dyeing only | Water repel Calender | Water repel Lamination | Dyeing only | Water repel Calender | Water repel Lamination | Dyeing only | Water repel Calender | Water repel Lamination |
| Scuffing | Warp (fluff/grade) | 1/4 | 0/5 | 0/5 | 1/4 | 0/5 | 0/5 | 1/4 | 0/5 | 0/5 |
| | Weft (fluff/grade) | 5/3 | 2/4 | 0/5 | 5/3 | 2/4 | 0/5 | 7/3 | 1/4 | 0/5 |
| | Overall evaluation | 3 | 4 | 5 | 3 | 4 | 5 | 3 | 4 | 5 |
| Air permeability | cc/cm$^2$ · sec | 15 | 15 | 0.001 | 20 | 20 | 0.001 | 22 | 22 | 0.001 |
| Water pressure resistance | cm | 20 | 20 | 2000 | 15 | 15 | 2000 | 15 | 15 | 2000 |
| Moisture permeability | g/m$^2$ · h | 1400 | 1400 | 450 | 1500 | 1500 | 400 | 1500 | 1500 | 400 |

| | | Examples | | | | | | | | |
|---|---|---|---|---|---|---|---|---|---|---|
| | | 10 | 11 | 12 | 13 | 14 | 15 | 16 | 17 | 18 |
| Fineness | Warp (dtex) | | 44 | | | 78 | | | 33/44 | |
| | Weft (dtex) | | 44 | | | 78 | | | 33/44 | |
| Twists | Warp | | Lattice: 280 T/m Taffeta: Non-twisted | | | 280 T/m | | | 33T non-twisted/44T 280 T/m | |
| | Weft | | Lattice: 280 T/m Taffeta: Non-twisted | | | Non-twisted | | | 33T non-twisted/44T 280 T/m | |
| Twist coefficient | Warp | | Lattice: 1857, Taffeta: 0 | | | 2472 | | | 0/1857 | |
| | Weft | | Lattice: 1857, Taffeta: 0 | | | 0 | | | 0/1857 | |
| Twisted yarn blend ratio | Warp (%) | | 28 | | | 100 | | | 89 | |
| | Weft (%) | | 40 | | | 0 | | | 87 | |
| | Total (%) | | 33 | | | 60 | | | 88 | |
| | Weave | | Rip-stop taffeta | | | 2/1 twill | | | Taffeta | |
| | Processing | Dyeing only | Water repel Calender | Water repel Lamination | Dyeing only | Water repel Calender | Water repel Lamination | Dyeing only | Water repel Calender | Water repel Lamination |
| Scuffing | Warp (fluff/grade) | 2/4 | 1/4 | 0/5 | 2/4 | 0/5 | 0/5 | 1/4 | 0/5 | 0/5 |
| | Weft (fluff/grade) | 7/3 | 1/4 | 1/4 | 10/3 | 6/3 | 2/4 | 1/4 | 0/5 | 0/5 |
| | Overall evaluation | 3 | 4 | 4 | 3 | 3 | 4 | 4 | 5 | 5 |
| Air permeability | cc/cm$^2$ · sec | 15 | 15 | 0.001 | 30 | 30 | 0.001 | 25 | 25 | 0.001 |
| Water pressure resistance | cm | 15 | 15 | 2000 | 10 | 10 | 2000 | 15 | 15 | 2000 |
| Moisture permeability | g/m$^2$ · h | 1400 | 1400 | 400 | 1200 | 1200 | 400 | 1300 | 1300 | 400 |

Comparative Examples 1 to 3

A plain woven fabric having a warp density of 165 ends/inch and weft density of 125 ends/inch was produced with a water jet loom using processed yarn subjected to false-twisting in the same manner as Examples 1 to 3, but not subjected to twisting, for the warp yarn and weft yarn. The resulting fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 2 along with the properties of the fabric (in Table 2, the term "fluff: 50↑" indicates the presence of scuffing at 50 locations or more").

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 2 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 2.

Comparative Examples 4 to 6

A plain woven fabric having a warp density of 170 ends/inch and weft density of 130 ends/inch was produced with a water jet loom using processed yarn subjected to false-twisting in the same manner as Examples 4 to 6, but not subjected to twisting, for the warp yarn and weft yarn. The resulting fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 2 along with the properties of the fabric.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 2 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 2.

Comparative Examples 7 to 9

A rip-stop woven fabric having a warp density of 130 ends/inch and weft density of 100 ends/inch was produced with a water jet loom using processed yarn subjected to false-twisting in the same manner as Examples 4 to 6, but not subjected to twisting. The resulting fabric was subjected to scouring, intermediate setting and dyeing followed by final setting in the same manner as Examples 1 to 3. The results of carrying out an abrasion durability test using a hook-and-loop fastener on the resulting fabric following final setting are shown in Table 2 along with the properties of the fabric. Furthermore, in the evaluation of scuffing in Table 2, planar refers to a state in which the entire abrasion surface was scuffed, while linear refers to a state in which scuffing occurred linearly in the direction of abrasion.

In addition, after final setting, products that had undergone water-repellent processing and calendering, and products that had undergone water-repellency processing and waterproof moisture-permeable film processing were obtained in the same manner as Examples 1 to 3. The results of carrying out abrasion durability tests using a hook-and-loop fastener on these products are also shown in Table 2 along with the properties of the fabrics. Furthermore, the abrasion durability tests were carried out on the water-repellent side.

Moreover, the values of air permeability, as measured according to Method A of Japanese Industrial Standard (JIS) L 1096 (Frazier method), water pressure resistance, as measured according to method A of Japanese Industrial Standard (JIS) L 1092, and moisture permeability, as measured according to Method B-2 of Japanese Industrial Standard (JIS) L 1099, are also shown in Table 2.

TABLE 2

| | | Comparative Examples | | | | | | | | |
|---|---|---|---|---|---|---|---|---|---|---|
| | | 1 | 2 | 3 | 4 | 5 | 6 | 7 | 8 | 9 |
| Fineness | Warp (dtex) | 44 | | | 78 | | | 78 | | |
| | Weft (dtex) | 44 | | | 78 | | | 78 | | |
| Twists | Warp | Non-twisted | | | Non-twisted | | | Non-twisted | | |
| | Weft | Non-twisted | | | Non-twisted | | | Non-twisted | | |
| Twist coefficient | Warp | 0 | | | 0 | | | 0 | | |
| | Weft | 0 | | | 0 | | | 0 | | |
| Twisted yarn blend ratio | Warp (%) | 0 | | | 0 | | | 0 | | |
| | Weft (%) | 0 | | | 0 | | | 0 | | |
| | Total (%) | 0 | | | 0 | | | 0 | | |
| | Weave | Plain | | | Plain | | | Rip-stop taffeta | | |
| | Processing | Dyeing only | Water repellency Calendering | Water repellency Lamination | Dyeing only | Water repellency Calendering | Water repellency Lamination | Dyeing only | Water repellency Calendering | Water repellency Lamination |
| Scuffing | Warp (fluff/grade) | 28/2 | 8/3 | 2/4 | 50↑/1 | 18/2 | 5/3 | Planar/1 | Linear/1 | Linear/1 |
| | Weft (fluff/grade) | 50↑/1 | 12/2 | 8/3 | 50↑/1 | 50↑/1 | 7/3 | Planar/1 | Planar/1 | Planar/1 |
| | Overall evaluation | 1 | 2 | 3 | 1 | 1 | 3 | 1 | 1 | 1 |
| Air permeability | cc/cm$^2$·sec | 15 | 15 | 0.001 | 20 | 20 | 0.001 | 22 | 22 | 0.001 |
| Water pressure resistance | cm | 20 | 20 | 2000 | 15 | 15 | 2000 | 15 | 15 | 2000 |
| Moisture permeability | g/m$^2$·h | 1200 | 1200 | 450 | 130 | 1300 | 40 | 1300 | 1300 | 400 |

INDUSTRIAL APPLICABILITY

According to the present invention, a fabric having a soft texture and superior abrasion resistance is obtained that overcomes the lack of abrasion resistance associated with fine yarn fabrics or processed yarn fabrics.

The invention claimed is:

1. A composite woven fabric obtained by carrying out lamination processing on at least one side of a woven fabric and water-repellent processing on the other side of the woven fabric, said woven fabric being composed of warp and weft yarns having superior wear resistance,
    wherein 100% of the total amount both of the warp yarns is composed of a polyamide filament fiber twisted yarn of a single fineness, 100% of the total amount of the weft yarns is composed of a polyamide filament fiber twisted yarn of a single fineness, said twisted yarns have been obtained by twisting a false-twist textured yarn.
2. The composite woven fabric according to claim 1, wherein the polyamide filament fiber twisted yarn has a twist coefficient of 200 to 10,000.
3. The composite woven fabric according to claim 2, wherein the twist coefficient is 500 to 5,000.
4. The composite woven fabric according to claim 3, wherein the twist coefficient is 1,000 to 3,000.
5. The composite woven fabric according to claim 1, wherein the lamination processing consists of laminating a flexible film.
6. The composite woven fabric according to claim 5, wherein the flexible film is a waterproof film.
7. The composite woven fabric according to claim 5, wherein the flexible film is a waterproof moisture-permeable film.
8. The composite woven fabric according to claim 7, wherein the waterproof moisture-permeable film is a porous film composed of a hydrophobic resin.
9. The composite woven fabric according to claim 8, wherein the hydrophobic resin is polytetrafluoroethylene.
10. The composite woven fabric according to claim 8, wherein the porous film is an expanded porous polytetrafluoroethylene film.
11. The composite woven fabric according to claim 8, wherein the porous film has a hydrophilic resin layer on the opposite side from the side laminated with the woven fabric.
12. The composite woven fabric according to any of claims 5 to 11, wherein the flexible film is further laminated with a second fabric on the opposite side from the side laminated with the woven fabric.
13. A clothing product comprising the composite woven fabric according to claim 1.
14. The clothing product according to claim 13, wherein the composite woven fabric is used in at least a portion of the shoulders, elbows, knees, sleeves or hems of the clothing product.
15. The clothing product according to claim 13, wherein the clothing product is a downproof fabric.
16. The clothing product according to claim 13, wherein the clothing product is a fabric for outdoor wear.
17. The clothing product according to claim 13, wherein the clothing product is a fabric for a windbreaker.

* * * * *